United States Patent [19]

Coran et al.

[11] 4,141,863

[45] Feb. 27, 1979

[54] THERMOPLASTIC COMPOSITIONS OF RUBBER AND POLYESTER

[75] Inventors: Aubert Y. Coran; Raman Patel, both of Akron, Ohio

[73] Assignee: Monsanto Company, St. Louis, Mo.

[21] Appl. No.: 903,092

[22] Filed: May 5, 1978

Related U.S. Application Data

[63] Continuation of Ser. No. 695,021, Jun. 11, 1976, abandoned.

[51] Int. Cl.$^2$ ............................................... C08L 7/00
[52] U.S. Cl. ........................................ 260/3; 260/4 R;
260/30.6 R; 260/30.8 R; 260/31.8 M; 260/31.8
XA; 260/31.8 PQ; 260/31.8 AN; 260/858;
260/859 R; 260/862; 260/873
[58] Field of Search ............ 260/3, 4, 30.6 R, 30.8 R,
260/31.8 M, 31.8 VA, 31.8 DR, 31.8 PQ, 31.8
AN, 859, 858, 862, 873

[56] References Cited

U.S. PATENT DOCUMENTS

| | | | |
|---|---|---|---|
| 3,231,634 | 1/1966 | Wismer et al. | 260/873 |
| 3,554,857 | 1/1971 | Barton | 260/3 |
| 3,564,077 | 2/1971 | Brinkmann et al. | 260/873 |
| 3,697,310 | 12/1972 | Kurihara et al. | 260/3 |
| 3,705,868 | 12/1972 | Honda et al. | 260/3 |
| 3,742,088 | 6/1973 | Holder et al. | 260/873 |
| 3,756,906 | 9/1973 | Leyland et al. | 260/3 |
| 3,793,132 | 2/1974 | Bhakuni et al. | 260/3 |
| 3,793,400 | 2/1974 | Curtis et al. | 260/873 |
| 3,813,358 | 5/1974 | O'Connell | 260/873 |
| 3,864,428 | 2/1975 | Nakamura et al. | 260/873 |
| 3,919,353 | 11/1975 | Castelnuovo et al. | 260/873 |
| 4,013,613 | 3/1977 | Abolins et al. | 260/873 |

FOREIGN PATENT DOCUMENTS 1408987 10/1975 United Kingdom.

*Primary Examiner*—Lewis T. Jacobs
*Attorney, Agent, or Firm*—Larry R. Swaney

[57] ABSTRACT

Thermoplastic compositions are described comprising blends of cross-linked rubber and thermoplastic linear crystalline polyester. Any thermoplastic polyesters having a softening point above 50° C. are suitable. Satisfactory rubbers include natural or synthetic diene rubber, polyurethane rubber and nitrile rubber. The blends may also contain plasticizers.

24 Claims, No Drawings

THERMOPLASTIC COMPOSITIONS OF RUBBER AND POLYESTER

This application is a Continuation of application S/N 695,021, filed June 11, 1976, now abandoned.

This invention relates to thermoplastic compositions and, more particularly, to thermoplastic compositions comprising blends of polyester and cross-linked rubber.

BACKGROUND OF THE INVENTION

Thermoplastics are compositions which can be molded or otherwise shaped and reprocessed at temperatures above their melting or softening point. Thermoplastic elastomers (elastoplastics) are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming and, in addition, many thermoplastics can be thermally welded.

SUMMARY OF THE INVENTION

It has been discovered that compositions comprising blends of thermoplastic linear crystalline polyesters and certain cross-linked rubbers exhibit useful properties which properties vary depending on the proportion of linear crystalline polyester and cross-linked rubber in the composition. Compositions containing linear crystalline polyester and cross-linked rubber are moldable thermoplastic compositions exhibiting improved strength and greater toughness than similar compositions containing substantially uncross-linked rubber. Compositions comprising less than 50 percent by weight of said linear crystalline polyester are elastoplastic, i.e., they exhibit elastomeric properties yet are processable as a thermoplastic. Compositions containing linear crystalline polyester and a liquid plasticizer are also elastoplastic even though the weight of polyester exceeds the weight of cross-linked rubber provided that the linear crystalline polyester comprises no more than 50 weight percent of the composition, the weight of plasticizer does not exceed the weight of polyester and the total weight of the cross-linked rubber and plasticizer does not exceed 85 weight percent of the composition.

A thermoplastic composition of the invention comprises a blend of thermoplastic linear crystalline polyester and rubber cross-linked to the extent that the gel content of the rubber is at least about 80 percent, the rubber being a homopolymer of 1,3-butadiene, a copolymer of 1,3-butadiene copolymerized with styrene, vinyl pyridine, acrylonitrile, or methacrylonitrile, a natural or synthetic polymer of isoprene, a urethane polymer or a copolymer of two or more alpha monoolefins optionally copolymerized with a minor quantity of diene or a mixture thereof, said cross-linked rubber being in an amount not exceeding 85 weight percent of the composition. Generally, thermoplastic compositions contain at least about 5 weight percent cross-linked rubber. Preferred thermoplastic compositions contain no more than 75 weight percent of polyester. More preferred thermoplastic compositions contain no more than 60 weight percent of polyester.

Elastoplastic compositions in accordance with this invention are compositions comprising blends of (a) thermoplastic linear crystalline polyester in an amount sufficient to impart thermoplasticity up to 50 weight percent of the composition, (b) rubber cross-linked to the extent that the gel content of the rubber is at least about 80 percent, the rubber being a homopolymer of 1,3-butadiene, a copolymer of 1,3-butadiene copolymerized with styrene, vinyl pyridine, acrylonitrile, or methacrylonitrile, a natural or synthetic polymer of isoprene, a urethane polymer or a copolymer of two or more alpha monoolefins optionally copolymerized with a minor quantity of diene or a mixture thereof, in an amount sufficient to impart rubberlike elasticity up to 85 weight percent of the composition and, (c) optionally, a plasticizer in an amount not exceeding the weight of polyester, in which the total weight of the rubber and plasticizer does not exceed 85 weight percent of the composition, which compositions are processable as thermoplastics and are elastomeric. Preferred elastoplastic compositions of the invention comprise blends in which the amount of rubber exceeds the amount of polyester, particularly blends of (a) about 20-50 parts by weight of thermoplastic polyester and (b) about 80-50 parts by weight of rubber per 100 total parts weight of polyester and rubber. More preferred compositions comprise blends of about 20-45 parts by weight of the polyester and about 80-55 parts by weight of the rubber per 100 total parts by weight of polyester and rubber. The elastoplastic compositions are elastomeric; yet they are processable as thermoplastics even though the rubber is cross-linked to a point where it is at least 80 percent insoluble in an organic solvent for the unvulcanized rubber. Further, they retain thermoplasticity even when the rubber is cross-linked to the extent that the rubber is essentially completely insoluble. The indicated relative proportions of polyester and rubber are necessary to provide sufficient rubber to give elastomeric compositions and to provide sufficient polyester to give thermoplasticity. When the amount of rubber exceeds about 85 parts by weight per 100 parts total weight of polyester and rubber, there is insufficient polyester present to provide a continuous phase and the composition is not thermoplastic. When the quantity of rubber, in the absence of plasticizer falls below about 50 parts by weight per 100 parts total weight of polyester and rubber, or when the quantity of polyester exceeds 50 weight percent of the composition, hard, rigid compositions having reduced toughness are obtained. The blends of the invention are envisaged as comprising microsized particles of cross-linked rubber dispersed throughout a continuous polyester matrix. Especially preferred compositions of the invention comprise cross-linked nitrile rubber. Compositions characterized by improved toughness, as represented by $(TS)^2/E$, wherein TS is tensile strength and E is Young's modulus, contain less than 50 weight percent polyester.

As indicated, the thermoplastic elastomers of the invention are rubbery compositions in which the rubber portion of the blend is cross-linked to a gel content of 80% or more or a cross-link density of $3 \times 10^{-5}$ or more moles of effective cross-links per milliliter of rubber. The procedure appropriate for evaluating the extent of cure depends upon the particular ingredients present in the blends. The properties of the compositions can be improved by further cross-linking the rubber until it is essentially completely cured which state of cure is indicated by a gel content of 96% or more. However, in this connection, essentially complete gelation of say 96% or more is not always a necessary criterion of a fully cured product because of differences in molecular weight, molecular weight distribution and other variables among diene rubbers which influence the gel determination. Determination of the cross-link density of the rubber is an alternative means of determining state of cure of the vulcanizates but must be determined indirectly because the presence of the polyester interferes with the determination. Accordingly, the same rubber as present in the blend is treated under conditions with respect to time, temperature, and amount of curative which result in a fully cured product as demonstrated by its cross-link density, and such cross-link density is assigned to the blend similarly treated. In general, an effective cross-link density of about $7 \times 10^{-5}$ or more moles (number of cross-links divided by Avogadro's number) per milliliter of rubber is representative of the values for fully cured nitrile rubber, however, this value may be as low as about $5 \times 10^{-5}$ especially for polybutadiene rubber or polybutadienestyrene rubber. An effect of curing the composition is the very substantial improvement in mechanical properties which improvement directly relates to its practical uses. Surprisingly, the high strength elastomeric compositions are still thermoplastic as contrasted to thermoset elastomers.

Vulcanizable rubbers, although thermoplastic in the unvulcanized state, are normally classified as thermosets because they undergo the process of thermosetting to an unprocessable state. The products of the instant invention, although processable, are prepared from blends of rubber and polyester which are treated under time and temperature conditions to cross-link the rubber or are treated with curatives in amounts and under time and temperature conditions known to give cured products from static cures of the rubber in molds and, indeed, the rubber has undergone gelation to the extent characteristic of rubber subjected to a similar treatment alone. Thermosets are avoided in the compositions of the invention by simultaneously masticating and curing the blends. Thus, the thermoplastic compositions of the invention are preferably prepared by blending a mixture of rubber, polyester, and curatives when required, then masticating the blend at a temperature sufficient to effect cross-link formation, using conventional masticating equipment, for example, Banbury mixer, Brabender mixer, or certain mixing extruders. The polyester and rubber are mixed at a temperature sufficient to soften the polyester or, more commonly, at a temperature above its melting point. After the polyester and rubber are intimately mixed, curative is added if needed. Heating and masticating at vulcanization temperatures are generally adequate to complete the cross-link formation in a few minutes or less, but if shorter times are desired, higher temperatures may be used. A suitable range of temperatures for cross-link formation is from about the melting temperature of the polyester to the decomposition temperature of the rubber which range commonly is from about 150° C. to 270° C. with the maximum temperature varying somewhat depending on the type of rubber, the presence of antidegradants and the mixing time. Typically, the range is from about 160° C. to 250° C. A preferred range of temperatures is from about 180° C. to about 230° C. To obtain thermoplastic compositions, it is important that mixing continues without interruption until cross-linking occurs. If appreciable cross-linking is allowed after mixing has stopped, a thermoset unprocessable composition may be obtained. A few simple experiments within the skill of the art utilizing available rubbers and curative systems will suffice to determine their applicability for the preparation of the improved products of this invention. For additional information on dynamic cross-linking processes, see Gessler and Haslett, U.S. Pat. No. 3,037,954.

Methods other than the dynamic vulcanization of rubber/polyester blends can be utilized to prepare compositions of the invention. For example, the rubber can be fully vulcanized in the absence of the polyester, either dynamically or statically, powdered, and mixed with the polyester at a temperature above the melting or softening point of the polyester. Provided that the cross-linked rubber particles are small, well dispersed and in an appropriate concentration, the compositions within the invention are easily obtained by blending cross-linked rubber and polyester. Accordingly, the term "blend" herein means a mixture comprising well dispersed small particles of cross-linked rubber. A mixture which is outside of the invention because it contains poorly dispersed or too large rubber particles can be comminuted by cold milling (to reduce particle size to below about 50μ) preferably below 20μ and more preferably to below 5μ. After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The compositions of the invention are all processable in an internal mixer, to products which, upon transferring at temperatures above the softening or crystallizing points of the polyester phase, to the rotating rolls of a rubber mill, form continuous sheets. The sheets are reprocessable in the internal mixer, after reaching temperatures above the softening or melting points of the polyester phase. The material is again transformed to the plastic state (molten state of the polyester phase) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion or injection molding.

Where the determination of extractables is an appropriate measure of the state of cure, an improved thermoplastic composition is produced by cross-linking a blend to the extent that the composition contains no more than about twenty percent by weight of the rubber extractable at room temperature by a solvent which dissolves the uncured rubber, and preferably to the extent that the composition contains less than four per cent by weight extractable and more preferably less than two percent by weight extractable. In general with non self-curing rubber, the less extractables the better are the properties, whereas, with self-curing rubber, respectable properties are obtained with extracta bles as high as twenty percent, but with either non self-curing rubber or self-curing rubber the more preferable compositions comprise low quantities of extractable rubber. Gel content reported as percent gel is determined by the procedure of U.S. Pat. No. 3,203,937 which comprises determining the amount of insoluble polymer by soaking the specimen for 48 hours in a solvent for the rubber at room temperature and weighing the dried residue and making suitable corrections based upon knowledge of the composition. Thus, corrected initial and final weights are obtained by subtracting from the initial weight, the weight of soluble components, other than the rubber, such as extender oils, plasticizers and components of the polyester soluble in organic solvent. Any insoluble pigments, fillers, etc., are subtracted from both the initial and final weights.

To employ cross-link density as the measure of the state of cure which characterizes the improved thermoplastic compositions, the blends are cross-linked to the extent which corresponds to cross-linking the same rubber as in the blend statically cross-linked under pressure in a mold with such amounts of the same curative if present as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically cross-linked under similar conditions (with the same amount of curative, when present, based on the rubber content of the blend) as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives with the rubber alone the aforesaid cross-link density that the curative does not react with the polyester or that there is no reaction between the polyester and rubber. There may be highly significant reactions involved but of limited extent. However, the assumption that the cross-link density determined as described provides a useful approximation of the cross-link density of the elastoplastic compositions is consistent with the thermoplastic properties and with the fact that a large proportion of the polyester can be removed from the composition by extraction with a solvent for the polyester such as a 60/40 mixture of phenol/tetrachloroethane as a solvent for poly terephthalates.

The cross-link density of the rubber is determined by equilibrium solvent swelling using the Flory-Rehner equation, *J. Rubber Chem. and Tech.*, 30, p. 929 (1957). The appropriate Huggins solubility parameters for rubber-solvent pairs used in the calculation were obtained from the review article by Sheehan and Bisio, *J. Rubber Chem. & Tech.*, 39, 149 (1966). If the extracted gel content of the vulcanized rubber is low, it is necessary to use the correction of Bueche wherein the term $v_r^{1/3}$ is multiplied by the gel fraction (% gel/100). The cross-link density is half the effective network chain density $\nu$ determined in the absence of polyester. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

Rubber satisfactory for the practice of the invention comprise essentially random noncrystalline, rubbery polymer selected from the group consisting of a homopolymer of 1,3-butadiene, a copolymer of 1,3-butadiene polymerized with styrene, vinyl pyridine, acrylonitrile, or methacrylonitrile, natural or synthetic polymers of isoprene, urethane polymers and polymers of two or more alpha monoolefins optionally polymerized with a minor quantity of diene or mixtures thereof.

Suitable monoolefin copolymer rubber comprises essentially noncrystalline, rubber copolymer of two or more alpha monoolefins, preferably copolymerized with at least one polyene, usually a diene. However, saturated monoolefin copolymer rubber, commonly called "EPM" rubber, can be used, for example copolymers of ethylene and propylene. Examples of unsaturated monoolefins copolymer rubber, commonly called "EPDM" rubber, which are satisfactory comprise the products from the polymerization of monomers comprising two monoolefins, generally ethylene and propylene, and a lesser quantity of nonconjugated diene. Suitable alpha monoolefins are illustrated by the formula $CH_2 = CHR$ in which R is hydrogen or alkyl of 1–12 carbon atoms, examples of which include ethylene, propylene, 1-butene, 1-pentene, 1-hexene, 2-methyl-1-propene, 3-methyl-1-pentene, 4-methyl-1-pentene, 3,3-dimethyl-1-butene, 2,4,4-trimethyl-1-pentene, 5-methyl-1-hexene, 1,4-ethyl-1-hexene and others. Satisfactory nonconjugated dienes include straight chain dienes as 1,4-hexadiene, cyclic dienes such as cyclooctadiene and bridged cyclic dienes such as ethylidenenorborene. Commercially available rubbers suitable for the practice of the invention are described in Rubber World Blue Book, 1975 Edition, Materials and Compounding Ingredients for Rubber as follows: EPM and EPDM rubber, pages 403, 406–410, Nitrile Rubber, pages 416–430, Polybutadiene Rubber, pages 431–432, Polyisoprene Rubber, pages 439–440, Styrene Butadiene Rubber, pages 452–460, and Urethane Rubber, pages 463–466. Copolymers of 1,3-butadiene and about 15–60% acrylonitrile commonly called nitrile rubber are preferred. Both self-curing and non self-curing nitrile rubbers are suitable in the practice of the invention. Non self-curing nitrile rubber as the name implies requires the presence of curatives to cross-link the rubber under processing temperatures to the extent that the gel content of the rubber is at least about 80 percent or more. Self-curing nitrile rubber as the name indicates will cross-link under processing temperatures in the absence of curatives (other than curatives which may be inherently present) to the extent that the gel content of the rubber is at least about 80 percent or more. Compositions of the invention comprising blends in which the rubber component is self-curing nitrile rubber generally exhibit superior tensile strengths and consequently are preferred. Blends comprising self-curing nitrile rubber may be cross-linked further by the use of conventional curatives as hereinafter described which use generally results in a further increase in the tensile strength of the resulting composition.

Whether a nitrile rubber is self-curing or non self-curing is not dependent on acrylonitrile content or Mooney Viscosity but appears to be an inherent property of certain rubbers. A convenient means for determining whether a nitrile rubber is self-curing comprises masticating the rubber at 225° C. in a Brabenber mixer and observing its tendency to scorch. Self-curing nitrile rubbers generally scorch under the aforesaid conditions within 2–8 minutes, whereas, non self-curing rubbers generally may be subjected to the aforesaid treatment for twenty minutes or more without scorching. Scorching as used above means the rubber loses its ability to maintain a continuous mass in the mixer but instead crumbles into discrete particles with some of the particulate crumbs discharging from the throat of the mixer if the ram is lifted while mixing is continued. The scorched rubber or the rubber having been masticated for twenty minutes as described is dumped from mixer, compression molded at 230° C. for five minutes and the gel content determined by extraction in dichloromethane at room temperature. A self-curing rubber will have a gel content of about 80 percent or more (weight extractable of 20 percent or less), whereas, a non self-curing rubber will have a gel content of less than 80 percent.

Suitable thermoplastic polyesters comprise linear, crystalline, high molecular weight solid polymers having recurring

groups including

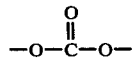

groups within the polymer chain. The term "linear" as used herein in respect to polyester means a polymer in which the recurring ester groups are within the polymer backbone and not pendant therefrom. Linear crystalline polyesters having a softening point above 50° C. are satisfactory with polyesters having a softening point or melting point above 100° being preferred with polyesters having a softening point or melting point between 160°–260° C. being more preferred. Saturated linear polyesters (free of olefinic unsaturation) are preferred, however, unsaturated polyesters may be used provided that the rubber is cross-linked prior to blending with the polyester or provided that the rubber is dynamically cross-linked with a cross-linking agent that will not significantly induce cross-link formation in the polyester. Cross-linked polyesters are unsatisfactory for the practice of the invention. If significant cross-link formation of the polyester is permitted to occur, the resulting composition is not thermoplastic. Many commercially available thermoplastic linear crystalline polyesters may be advantageously employed in the practice of the invention or they may be prepared by polymerization of one or more dicarboxylic acids, anhydrides or esters and one or more diol. Examples of satisfactory polyester include poly(trans-1,4-cyclohexylene $C_{2-6}$ alkane dicarboxylates such as poly(trans-1,4-cyclohexylene succinate) and poly(trans-1,4-cyclohexylene adipate), poly(cis or trans-1,4-cyclohexanedimethylene) $C_{0-2}$ alkanedicarboxylates such as poly(cis 1,4-cyclohexanedimethylene)oxalate and poly(cis 1,4-cyclohexanedimethylene)succinate, poly($C_{2-4}$ alkylene terephthalates) such as polyethyleneterephthalate and polytetramethyleneterephthalate, poly($C_{2-4}$ alkylene isophthalates such as polyethyleneisophthalate and polytetramethyleneisophthalate, poly(p-phenylene $C_{1-8}$ alkanedicarboxylates such as poly(p-phenylene glutarate) and poly(p-phenylene adipate), poly(p-xylene oxalate), poly(o-xylene oxalate), poly(p-phenylenedi-$C_{1-5}$ alkylene terephthalates) such as poly(p-phenylenedimethylene terephthalate) and poly(p-phenylene-di-1,4-butylene terephthalate, poly($C_{2-10}$ alkylene-1,2-ethylenedioxy-4,4′-dibenzoates) such as poly(ethylene-1,2-ethylenedioxy-4,4′-dibenzoates), poly(tetramethylene-1,2-ethylenedioxy-4,4′-dibenzoate) and poly(hexamethylene-1,2-ethylenedioxy-4,4′-dibenzoate), poly($C_{3-10}$ alkylene-4,4′-dibenzoates) such as poly(pentamethylene-4,4′-dibenzoate), poly(hexamethylene-4,4′-dibenzoate and poly(decamethylene-4,4′-dibenzoate), poly($C_{2-10}$ alkylene-2,6-naphthalene dicarboxylates) such as poly(ethylene-2,6-naphthalene dicarboxylates), poly(trimethylene-2,6-naphthalene dicarboxylates) and poly(tetramethylene-2,6-naphthalene dicarboxylates), and poly($C_{2-10}$ alkylene sulfonyl-4,4′-dibenzoates) such as poly(octamethylene sulfonyl-4,4′-dibenzoate) and poly(decamethylene sulfonyl-4,4′-dibenzoate. Additional examples of satisfactory linear polyesters are described in *Encyclopedia of Polymer Science and Technology*, Vol. 11, pages 68–73 and Korshak & Vinogradova Polyesters, Pergamon Press, pages 31–64. The disclosures thereof are hereby incorporated herein by reference. Suitable polycarbonates are also commercially available. For suitable segmented poly(ether-co-phthalates) see page 461, Rubber World Blue Book, supra. Polylactones such as polycaprolactone are satisfactory in the practice of the invention. Preferred polyesters of the invention are derived from aromatic dicarboxylic acids such as naphthalenic or phthalic acids. More preferred polyesters are poly(alkylene terephthalates) especially poly(tetramethylene terephthalate), or mixed polyphthalates derived from two or more glycols, two or more phthalic acids, or two or more glycols and two or more phthalic acids such as poly(alkylene tere-co-isophthalates).

Moreover, the particular results obtained by the aforedescribed dynamic curing process are a function of the particular rubber curing system selected. The curatives and the curative systems conventionally used to vulcanize diene rubbers are utilizable for preparing the improved thermoplastics of the invention. Any curative or curative system applicable for vulcanization of diene rubbers may be used in the practice of the invention, for example, peroxide, azide, quinoid or accelerated sulfur vulcanization systems. The combination of a maleimide and a peroxide or disulfide accelerator can be used. For satisfactory curatives and curative systems, reference is made to columns 3–5 of Fisher U.S. Pat. No. 3,806,558, which disclosure is incorporated herein by reference. Sufficient quantities of curatives are used, when needed, to cross-link the rubber to achieve a gel content of 80 percent or more. Excessive quantities of curatives should be avoided because quantities well beyond the amount necessary to fully cure the rubber can result in diminution of properties, for example, a reduction in ultimate elongation. Peroxide curatives are advantageously used in reducing quantities in conjunction with other curatives such as sulfur or bismaleimide providing the total amount of curatives is sufficient to vulcanize fully the rubber. High energy radiation is also utilizable as the curative means.

Curative systems comprising phenylene bis-maleimide, optionally with a peroxide activator, are especially recommended. Also, particularly recommended are efficient or semi-efficient sulfur curative systems which comprise high accelerator sulfur ratios as contrasted with conventional sulfur curative systems wherein the amount of sulfur exceeds the amount of the accelerator.

One aspect of the invention comprises adding a liquid plasticizer to the blend which plasticizer extends the range of proportions of polyester to rubber in the composition while still retaining elastoplasticity. For example, without plasticizer the weight of polyester cannot exceed the weight of rubber without losing rubberlike elasticity, whereas, with plasticizer the weight of polyester may exceed the weight of rubber so long as the amount of polyester does not comprise more than 50 weight percent of the total composition and the weight of plasticizer does not exceed the weight of polyester. Generally, the quantity of plasticizer when present is between 10–30 weight percent of the total composition. Any polyester plasticizer may be used. Suitable plasticizers include phthalate esters such as dicyclohexyl phthalate, dimethyl phthalate, dioctyl phthalate, butyl benzyl phthalate, benzyl phthalate, phosphates such as tributoxyethyl phosphate, tributyl phosphate, tricresyl phosphate, cresyl diphenyl phosphate, 2-ethylhexyl diphenyl phosphate, isodecyl diphenyl phosphate, and triphenyl phosphate, phthalyl glycolates such as butyl phthalyl butyl glycolate and methyl ethyl glycolate, sulfonamides such as N-cyclohexyl-p-toluenesulfonamide, N-ethyl-o,p-toluenesulfonamide, o,p-toluenesulfonamide and o-toluene sulfonamide and extender oils for hydrocarbon rubbers.

Another aspect of the invention comprises adding a rubber antidegradant to the blend prior to dynamic vulcanization. The presence of a rubber antidegradant protects the blend from thermal and/or oxidative degradation resulting in compositions with superior properties. Preferably, the rubber antidegradant is added early in the mixing cycle, and more preferably, for greater effectiveness the antidegradant is masterbatched with the rubber and a portion of the rubber-antidegradant masterbatch is mixed with the polyester. The polyester then melts and after complete mixing, the composition is dynamically cured as described above. For suitable rubber antidegradants, refer to Rubber World Blue Book, supra, pages 107–140.

The properties of the thermoplastic compositions of this invention may be modified, either before or after vulcanization, by addition of ingredients which are conventional in the compounding of diene rubber, polyester and blends thereof. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, rubber plasticizers, wax, prevulcanization inhibitors, discontinuous fibers such as wood cellulose fibers and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the polyester. Carbon black improves the tensile strength and rubber plasticizer can improve the resistance to oil swell, heat stability, hysteresis, cost and permanent set of the elastoplastic compositions. Aromatic, naphthalenic and paraffinic extender oils are plasticizers for polybutadiene and butadiene-vinylarene type rubbers. Plasticizers can also improve processability. For suitable extender oils, refer to Rubber World Blue Book, supra, pages 145–190. The quantity of extender oil added depends upon the properties desired, with the upper limit depending upon the compatibility of the particular oil and blend ingredients which limit is exceeded when excessive exuding of extender oil occurs. Typically, 5–75 parts by weight extender oil are added per 100 parts by weight of rubber and polyester. Commonly, about 10 to 60 parts by weight of extender oil are added per 100 parts by weight of rubber in the blend with quantities of about 20–50 parts by weight of extender oil per 100 parts by weight of rubber being preferred. Typical additions of carbon black comprise about 20–100 parts by weight of carbon black per 100 parts by weight of rubber and usually about 25–60 parts by weight carbon black per 100 parts total weight of rubber and extender oil. The amount of carbon black which can be used depends, at least in part, upon the type of black and the amount of extender oil to be used. The amount of extender oil depends, at least in part, upon the type of rubber. If nitrile rubber is used, polyvinylchloride-type plasticizers are commonly used in place of extender oils.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics, in particular, polyesters. The compositions of the invention are blended with thermoplastics using conventional mixing equipment. The properties of the blend depend upon the proportions. Generally, the amount is such that the blend contains sufficient cross-linked rubber to obtain the desired effect.

The stress-strain properties of the compositions are determined in accordance with the test procedures set forth in ASTM D638 and ASTM D1566. An approximate toughness is calculated by an abbreviated Griffith equation $(TS)^2/E$ (TS=tensile strength, E=Young's modulus). For a detailed analysis, refer to Fracture, edited by H. Liebowitz, published by Academic Press, New York, 1972, Ch. 6, Fracture of Elastomers by A. N. Gent. The term "elastomeric" as used herein and the claims means a composition which possesses the property of forcibly retracting within one minute to less than 160% of its original length after being stretched at room temperature to twice its length and held for one minute before release. Especially preferred compositions of the invention are rubbery compositions having tension set values of about 50% or less which compositions meet the definition for rubber as defined by ASTM Standards, V. 28, p. 756 (D1566). More preferred compositions are rubbery compositions having a Shore D hardness of 60 or below or a 100% modulus of 180 Kg./cm$^2$ or less or a Young's modulus below 2500 Kg./cm$^2$.

DESCRIPTION OF PREFERRED EMBODIMENTS

A typical procedure for the preparation of compositions of the invention comprises mixing in the indicated proportions rubber and polyester in a Brabender mixer with an oil bath temperature as indicated for a time sufficient, usually between 2–6 minutes, to melt the polyester and to form a blend. Hereinafter, mix temperature will be understood to be the temperature of the oil bath with the realization that the actual temperature of the mixture may vary. Curatives are added, if needed, to cross-link the rubber, and mixing is continued until a maximum Brabender consistency is reached, usually between 1–5 minutes, and for an additional two minutes thereafter. The order of mixing can vary but all the ingredients should be added and mixed before substantial vulcanization occurs. The vulcanized but thermoplastic composition is removed, sheeted on a mill (or sheeted by compression in a press), returned to the Brabender and mixed at the same temperature for two minutes. The material is again sheeted and then compression molded at 200°-270° C. and cooled below 100° C. under pressure before removal. Properties of the molded sheet are measured and recorded. The aforesaid procedure is followed in the examples below unless stated otherwise.

Ingredients used to illustrate the invention are N'-(1,3-dimethylbutyl)-N'-(phenyl)-p-phenylenediamine (Santoflex® 13 antidegradant), Polymerized 1,2-dihydro-2,2,4-trimethylquinoline (Flectol® H antidegradant), m-phenylene bis-maleimide (HVA-2), 2-(morpholinothio)benzothiazole (Santocure ® - MOR accelerator), tetramethylthiuram disulfide (TMTD), and 2-bis-benzothiazyl disulfide (MBTS); All ingredients including polyester and rubber shown in the tables are in parts by weight.

Table I illustrates elastoplastic compositions of the invention containing six different self-curing nitrile rubbers. The compositions contain 50 parts by weight nitrile rubber, 50 parts by weight by poly(tetramethylene terephthalate) designated PTMT, m.p. about 224° C., glass transition temperature about 43° C., tensile strength at yield 562 Kg./cm², elongation at fracture 250%, and 1.5 parts Santoflex ® 13 antidegradant. All stocks are masticated in a Brabender mixer at 225° C. with a mixing speed of 100 rpm for a total mix time of 6-8 minutes in accordance with the typical procedure explained above. The compositions are compression molded into sheets 1.5-2.5 mm thick at 250° C. and cooled under pressure before removal. The gel contents (weight percent insoluble in methylene chloride) of the compositions are determined with the same rubber cured under similar but static conditions and in the absence of polyester. The compositions are elastomeric, processable as thermoplastics and reprocessable without the need for reclaiming in contrast to ordinary thermoset vulcanizates. The data show that all six rubbers self-cures to the extent that the gel content of the rubber is more than 80 percent. The elastomeric properties (tension set) of the compositions are similar regardless of the acrylonitrile (AN) content or Mooney Viscosity of the nitrile rubber in the blend.

Compositions of the invention comprising different proportions of nitrile rubber and polyester are illustrated in Table II. The nitrile rubber is a self-curing rubber containing 43 weight percent acrylonitrile having a Mooney Viscosity of 95. The PTMT is the same as in Table I. The procedure for preparing the composition is the same as in Table I. The compositions are all thermoplastic and the compositions of Stocks 4-6 illustrate preferred elastomeric compositions exhibiting tension set values of less than 50 percent. The data further show that a substantial jump in toughness, $(TS)^2/E$, of the compositions occurs when the amount of rubber exceeds the amount of polyester.

TABLE II

|  | 1 | 2 | 3 | 4 | 5 | 6 |
|---|---|---|---|---|---|---|
| Nitrile rubber | 10 | 25 | 40 | 55 | 70 | 85 |
| PTMT | 90 | 75 | 60 | 45 | 30 | 15 |
| Santoflex 13 | 3 | 3 | 3 | 3 | 3 | 3 |
| mix speed, rpm | 100 | 100 | 100 | 100 | 100 | 100 |
| mix temp., ° C. | 225 | 225 | 225 | 225 | 225 | 225 |
| Tensile strength, Kg./cm2 | 412 | 352 | 270 | 237 | 189 | 106 |
| 100% modulus, Kg./cm2 | — | 258 | 194 | 135 | 88 | 38 |
| Young's modulus, Kg./cm2 | 11850 | 7950 | 3580 | 1410 | 330 | 67 |
| Ult. Elongation, % | 30 | 280 | 330 | 330 | 310 | 300 |
| $(TS)^2/E$, Kg./cm2 | 14 | 16 | 20 | 40 | 108 | 167 |
| tension set, % | — | 76 | 56 | 35 | 17 | 5 |
| Shore D, hardness | 79 | 72 | 62 | 48 | 38 | 29 |

The data of Table III illustrate the effect of curative on compositions containing self-curing nitrile rubber and polyester. The nitrile rubber and PTMT are the same as shown in Table II and the compositions are prepared by the typical procedure except that in Stocks 1, 2, 4, 6 and 8 m-phenylene bis-maleimide curative is added to the blend two minutes after melting of the polyester. The cross-linking density of the rubber in compositions containing curative is greater than $7 \times 10^{-5}$ moles per milliliter of rubber. The data show that the addition of curative increases the tensile strength.

TABLE III

|  | 1 | 2 | 3 | 4 | 5 | 6 | 7 | 8 |
|---|---|---|---|---|---|---|---|---|
| Nitrile rubber | 30 | 40 | 50 | 50 | 60 | 60 | 70 | 70 |
| PTMT | 70 | 60 | 50 | 50 | 40 | 40 | 30 | 30 |
| Santoflex 13 | 1 | 1 | 1 | 1 | 1 | 1 | 1 | 1 |
| HVA-2 | 1.7 | 1.7 | — | 1.7 | — | 2 | — | 2 |
| mix temp.,° C. | 220 | 220 | 220 | 220 | 220 | 220 | 220 | 220 |
| TS, Kg./cm² | 354 | 287 | 227 | 278 | 197 | 236 | 180 | 227 |
| 100% M, Kg./cm² | — | 227 | 148 | 187 | 104 | 149 | — | — |
| Young's modulus, Kg./cm² | 6706 | 3503 | 1816 | 2143 | 745 | 1034 | 384 | 467 |
| Ult. Elongation,% | 250 | 240 | 330 | 260 | 350 | 240 | 320 | 320 |
| $(TS)^2/E$, Kg./cm² | 19 | 24 | 28 | 36 | 53 | 54 | 84 | 110 |
| tension set, % | 71 | 59 | 43 | 45 | 25 | — | 16 | 16 |
| Shore D, hardness | 69 | 61 | 51 | 55 | 41 | — | 36 | 38 |

Elastoplastic compositions of the invention comprising non self-curing nitrile rubber are illustrated in Table

TABLE I

| Stock No. | Nitrile Rubber | | Gel Content,% | TS, Kg./cm2 | 100% M, Kg./cm2 | E, Kg./cm2 | $(TS)^2/E$, Kg./cm2 | UE, percent, | Tension Set percent | Shore D Hardness |
|---|---|---|---|---|---|---|---|---|---|---|
|  | AN content, Wt.-% | Mooney Visc., ML 1+4 (100° C) |  |  |  |  |  |  |  |  |
| 1 | 33 | 80 | 83 | 184 | 152 | 1827 | 18 | 180 | 37 | 50 |
| 2 | 33 | 95 | 91 | 176 | 163 | 2270 | 14 | 140 | 39 | 52 |
| 3 | 41 | 50 | 89 | 185 | 158 | 2124 | 16 | 190 | 42 | 53 |
| 4 | 41 | 80 | 85 | 215 | 169 | 2795 | 17 | 250 | 50 | 55 |
| 5 | 41 | 95 | 86 | 230 | 154 | 1772 | 30 | 310 | 41 | 52 |
| 6 | 43 | 95 | 93 | 248 | 154 | 2097 | 29 | 330 | 45 | 52 |

IV. The polyester is the same as in Table I and compositions are prepared in the same manner. Stocks 1, 4 and 7 are controls containing no curative. The cross-link density of the rubber of the compositions containing curative is greater than $7 \times 10^{-5}$ moles per millimeter of rubber and the gel content of the rubber is estimated to be greater than 90%. The data show that curing the rubber results in compositions exhibiting substantially improved elastomeric properties as indicated by the reduction in tension set, and results in significant increases (100 percent or more) in tensile strength and toughness.

Young's modulus, E, of 21,000–24,600 Kg./cm². The polyester, called Polyester-A, of Stock 2 is a mixed

TABLE IV

|  | 1 | 2 | 3 | 4 | 5 | 6 | 7 | 8 | 9 |
|---|---|---|---|---|---|---|---|---|---|
| Nitrile rubber[1] | 50 | 50 | 50 | 60 | 60 | 60 | 70 | 70 | 70 |
| PTMT | 50 | 50 | 50 | 40 | 40 | 40 | 30 | 30 | 30 |
| Santoflex 13 | 1.25 | 1.25 | 1.25 | 1.25 | 1.25 | 1.25 | 1.25 | 1.25 | 1.25 |
| HVA-2 | 0 | 1 | 2 | 0 | 1 | 2 | 0 | 1 | 2 |
| TS, Kg./cm² | 65 | 165 | 187 | 41 | 116 | 142 | 30 | 105 | 129 |
| Young's modulus, Kg./cm² | 604 | 1914 | 1714 | 172 | 605 | 693 | 57 | 154 | 253 |
| Ult. Elong., % | 90 | 120 | 150 | 160 | 150 | 150 | 330 | 200 | 210 |
| (TS)²/E, Kg./cm² | 7 | 14 | 20 | 10 | 22 | 29 | 16 | 72 | 66 |
| tension set, % | 50 | 38 | 34 | 36 | 23 | 25 | 26 | 12 | 14 |
| Shore D, hardness | 37 | 46 | 50 | 27 | 35 | 39 | 18 | 26 | 29 |

[1]Non self-curing nitrile rubber, acrylonitrile 41 wt.%, Mooney Viscosity 75, gel content under cure conditions sans curative, 65%.

Compositions of the invention containing styrene-butadiene rubber are illustrated in Table V. The rubber is a non-staining, cold polymerized styrene-butadiene rubber having a target bound styrene of 23.5% and nominal Mooney Viscosity of 52. The compositions, in which the relative proportions of rubber and polyester are varied, are prepared by the typical procedure as previously described. Stocks 1, 3 and 6 are controls containing no curative. The data indicate that curing the rubber results in compositions exhibiting tensile strengths of 50% or more than the compositions containing uncured rubber and that larger increases in tensile strength can be achieved by using more curative (Stocks 4 and 5).

TABLE V

|  | 1 | 2 | 3 | 4 | 5 | 6 | 7 |
|---|---|---|---|---|---|---|---|
| SBR-1503 | 50 | 50 | 60 | 60 | 60 | 70 | 70 |
| PTMT | 50 | 50 | 40 | 40 | 40 | 30 | 30 |
| Santoflex 13 | 1 | 1 | 1 | 1 | 1 | 1 | 1 |
| HVA-2 | — | 1.5 | — | 1.5 | 3 | — | 1.5 |
| mix speed, rpm | 100 | 100 | 100 | 100 | 100 | 100 | 100 |
| mix temp., °C. | 220 | 220 | 220 | 220 | 220 | 220 | 220 |
| TS, Kg./cm² | 109 | 167 | 68 | 133 | 179 | 51 | 87 |
| Young's modulus, Kg./cm² | 1519 | 1603 | 423 | 886 | 1083 | 101 | 253 |
| Ult. Elong., % | 40 | 110 | 70 | 120 | 130 | 110 | 110 |
| (TS)²/E, Kg./cm² | 8 | 17 | 11 | 20 | 30 | 26 | 30 |
| Shore D, hardness | 47 | 50 | 31 | 41 | 46 | 30 | 21 |

TABLE VI

|  | 1 | 2 | 3 | 4 | 5 |
|---|---|---|---|---|---|
| Nitrile rubber[1] | 50 | 60 | 60 | 60 | 55 |
| Polycarbonate | 50 | — | — | — | — |
| Polyester - A | — | 40 | — | — | — |
| Polyester - B | — | — | 40 | — | — |
| Polycaprolactone | — | — | — | 40 | — |
| Poly(ether-co-phthalate)[3] | — | — | — | — | 45 |
| Santoflex 13 | 1.5 | — | — | — | — |
| Flectol H | — | — | — | — | 1.0 |
| peroxide[2] | — | 0.12 | 1.2 | 1.2 | — |
| HVA-2 | — | 0.6 | — | — | 1.0 |
| mix speed, rpm | 120 | 50 | 50 | 50 | — |
| mix temp., °C | 220 | 180 | 180 | 180 | — |
| TS, Kg./cm² | 212 | 99 | 136 | 124 | 202 |
| 100% M, Kg./cm² | 187 | 68 | 23 | 47 | 79 |
| E, Kg./cm² | 2430 | 168 | 51 | 258 | 321 |
| Ult. Elong., % | 160 | 210 | 560 | 440 | 360 |
| (TS)²/E, Kg./cm² | 18 | 58 | 363 | 57 | 127 |
| Shore D, hardness | — | 29 | 21 | 28 | — |
| tension set, % | — | 11 | 4 | 29 | — |

[1]Same rubber as in Stock 6 of Table I
[2]2,5-dimethyl-2,5-di(t-butylperoxy)hexane
[3]Hytrel 6355

Compositions of the invention containing different polyesters are shown in Table VI. Stock 1 contains an engineering grade polycarbonate resin believed to be poly(2-propylidene-4,4'-bis phenol carbonate) having a softening point of 160° C., tensile strength of 632–808 Kg./cm², ult. elongation of 100–130 percent and Young's modulus, E, of 21,000–24,600 Kg./cm². The polyester, called Polyester-A, of Stock 2 is a mixed polyphthalate comprising a terpolymer of 1,4-butanediol 1,2-propanediol, and terephthalic acid (or terephthalate ester) having a melting point of 175° C. The polyester, called Polyester-B, of Stock 3 is a mixed polyphthalate comprising a tetramer of 1,4-butanediol, 1,2-propanediol, terephthalic acid and isophthalic acid (or corresponding esters) having a melting point of 116° C. The polyester of Stock 4 is a polycaprolactone having a structural formula $$-(CH_2)_5-\overset{O}{\underset{\|}{C}}-O\!-\!)_n$$

wherein n is more than 100 but less than 3000, melting point of 60° C., tensile strength 120–280 Kg./cm², density of 1.15 g/cc at 20° C. and a glass transition temperature of −60° C. All compositions are prepared by the typical procedure except for Stocks 3 and 4 wherein the rubber and polyester are first blended on a mill with the mixture being added to the internal mixer instead of the individual components. Elastoplastic compositions are obtained with all the different polyesters.

Compositions of the invention containing different rubbers are illustrated in Table VII. The polyesters are the same as in Table VI. Stock 1 is a control containing no curative. Stocks 2 and 3 illustrate elastoplastic compositions of the invention containing nitrile rubber prepared using sulfur curative systems and m-phenylene bis-maleimide curative systems, respectively. Stock 4 illustrates elastoplastic compositions of the invention containing EPDM rubber. Stock 5 illustrates elastoplastic compositions of the invention containing polybutadiene rubber. Stock 6 is a control with polyurethane rubber containing no curative. Stock 7 illustrates the significant improvement in properties obtained when a composition similar to Stock 6 is dynamically-vulcanized. Surprisingly, even though the rubber is extensively cross-linked resulting the substantial improvement in properties, the composition is still processable as a thermoplastic. All stocks are prepared by the typical procedure using a mixing speed of 80 rpm and mixing temperature of 180° C. Specimens are molded at 200° C. The data indicate that curing increases the tensile strength more than 100%, improves toughness, and substantially enhances the elasticity as shown by the reduction in tension set.

TABLE VII

|  | 1 | 2 | 3 | 4 | 5 | 6 | 7 |
|---|---|---|---|---|---|---|---|
| Nitrile rubber[1] | 60 | 60 | 60 | — | — | — | — |
| Polybutadiene rubber (Cis-1203) | — | — | — | — | 60 | — | — |

TABLE VII-continued

|  | 1 | 2 | 3 | 4 | 5 | 6 | 7 |
|---|---|---|---|---|---|---|---|
| Polyurethane rubber[2] | — | — | — | — | — | 60 | 60 |
| EPDM rubber | — | — | — | 60 | — | — | — |
| Polyester - A | 40 | 40 | 40 | 40 | 40 | — | — |
| Polyester - B | — | — | — | — | — | 40 | 40 |
| Flectol - H | 1.2 | 1.2 | 1.2 | — | — | — | — |
| Peroxide[2] | — | — | 0.6 | 0.6 | 0.3 | — | 0.6 |
| HVA-2 | — | — | 1.2 | 1.2 | 1.2 | — | 1.2 |
| Zinc oxide | — | 3 | — | — | — | — | — |
| Stearic acid | — | 0.6 | — | — | — | — | — |
| TMTD | — | 1.2 | — | — | — | — | — |
| Santocure-MOR |  |  |  |  |  |  |  |
| Sulfur | — | 0.12 | — | — | — | — | — |
| TS, Kg./cm$^2$ | 48 | 108 | 153 | 127 | 48 | 12 | 218 |
| 100% M, Kg./cm$^2$ | 48 | 59 | 71 | 60 | 31 | — | 96 |
| E, Kg./cm$^2$ | 143 | 213 | 303 | 300 | 62 | 44 | 262 |
| Ult. Elong., % | 240 | 320 | 310 | 380 | 170 | 90 | 240 |
| (TS)$^2$/E, Kg./cm$^2$ | 16 | 55 | 77 | 54 | 37 | 3 | 181 |
| tension set, % | 54 | 17 | 22 | 19 | 4 | — | 17 |
| Shore D, hardness | 26 | 32 | 32 | 35 | 22 | 17 | 32 |

[1]Non self-curing nitrile rubber containing 39 wt. % acrylonitrile and having a Mooney Viscosity of 50.
[2]Adiprene C- Sulfur vulcanizable millable gum polyurethane elastomer (Mooney Viscostiy of 55).

Compositions of the invention comprising a thermoplastic polyamide (Nylon 6) as an additional component is illustrated by Stocks 1, 4, 5, 8 and 9 of Table VIII. Elastoplastic compositions of the invention containing only polyester (Stocks 2 and 6) are included for purposes of comparison. Stocks 3 and 7 illustrate compositions comprising a blend of nitrile rubber and polyamide which compositions are described in greater detail in our copending patent application Ser. No. 663,453 filed Mar. 3, 1976, the disclosure of which is incorporated herein by reference. All stocks are prepared by the typical procedure except the mixing speed is 100 rpm until the resin melts afterwhich time the mixing speed is 80 rpm. The Brabender temperature is 230° C. and the molding temperature is 240° C. The nitrile rubber and PTMT are the same as in Table II and the polycarbonate is the same as in Table VI. Nylon 6 is polycaprolactam having a melting point of 216° C. The data indicate that when polyamide is present that the crystalline polymers share the rubber proportionally so that elastoplasticity is achieved. For example, in Stock 1 one half the rubber is considered as being associated with the nylon which means that the proportion of rubber to polyester is 40 parts to 10 parts (80/20 rubber to polyester ratio) which ratio as indicated earlier is necessary to achieve elastoplasticity.

TABLE VIII

|  | 1 | 2 | 3 | 4 | 5 | 6 | 7 | 8 | 9 |
|---|---|---|---|---|---|---|---|---|---|
| Nitrile rubber | 80 | 80 | 80 | 70 | 70 | 70 | 70 | 60 | 60 |
| PTMT | 10 | 20 | — | 15 | 20 | 30 | — | 20 | — |
| Nylon-6 | 10 | — | 20 | 15 | 10 | — | 30 | 20 | 20 |
| Polycarbonate | — | — | — | — | — | — | — | — | 20 |
| Flectol H | 1.6 | 1.6 | 1.6 | 1.4 | 1.4 | 1.4 | 1.4 | 1.2 | 1.2 |
| HVA-2 | 0.8 | 0.8 | 0.8 | 1.4 | 1.4 | 1.4 | 1.4 | 1.2 | 1.2 |
| TS, Kg./cm$^2$ | 102 | 113 | 122 | 166 | 165 | 198 | 207 | 165 | 165 |
| 100% M, Kg./cm$^2$ | 67 | 55 | 72 | 105 | 105 | 94 | 138 | 132 | 152 |
| Young's modulus, Kg./cm$^2$ | 206 | 119 | 196 | 594 | 550 | 401 | 970 | 1378 | 1804 |
| Ult. Elong., % | 210 | 240 | 190 | 220 | 220 | 280 | 230 | 180 | 140 |
| (TS)$^2$/E, Kg./cm$^2$ | 51 | 107 | 76 | 46 | 50 | 98 | 44 | 20 | 15 |
| Shore D, hardness | 27 | 24 | 30 | 38 | 37 | 34 | 43 | 47 | 51 |
| tension set, % | 10 | 8 | 11 | 22 | 23 | 18 | 36 | 35 | 47 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of
   a. thermoplastic linear crystalline polyester having a softening point above 50° C. in an amount sufficient to impart thermoplasticity up to 50 weight percent of the composition,
   b. rubber cross-linked to the extent that the gel content of the rubber is at least about 80 percent, the rubber being a homopolymer of 1,3-butadiene, a copolymer of 1,3-butadiene copolymerized with styrene, vinyl pyridine, acrylonitrile, or methacrylonitrile, a natural or synthetic polymer of isoprene, a urethane polymer or a copolymer of two or more alpha monoolefins optionally copolymerized with a minor quantity of diene or mixtures of said polymers, said rubber being in an amount sufficient to impart rubberlike elasticity up to 85 weight percent of the composition,
   which composition is processable as a thermoplastic and is elastomeric.

2. A composition of claim 1 comprising a blend of
   a. about 20-50 parts by weight of thermoplastic polyester and,
   b. about 80-50 parts by weight of rubber per 100 total parts of weight of rubber and polyester, cross-linked to the extent that the gel content of the rubber is at least about 80 percent, which composition is elastomeric and is processable as a thermoplastic.

3. The composition of claim 2 in which the rubber is cross-linked to the extent that the composition contains no more than about four percent by weight of rubber extractable at room temperature or that the cross-link density determined on the same rubber as in the composition is greater than about $3 \times 10^{-5}$ moles per ml of rubber.

4. The composition of claim 3 in which the rubber is cross-linked to the extent that the cross-link density of the rubber is at least about $5 \times 10^{-5}$ moles per ml.

5. The composition of claim 3 which contains no more than about four percent by weight of rubber extractable.

6. The composition of claim 2 in which the rubber is a copolymer of 1,3-butadiene and acrylonitrile.

7. The composition of claim 6 in which the polyester is derived from dicarboxylic compound and diol.

8. The composition of claim 2 prepared by masticating the blend at cross-linking temperature until the rubber is cross-linked.

9. The composition of claim 7 in which the blend comprises about 20 to about 45 parts by weight polyester and about 80 to about 55 parts by weight rubber.

10. The composition of claim 9 having a tensile strength at least 50% higher than the tensile strength of the same composition except the rubber is not cross-linked.

11. The composition of claim 6 in which the polyester is polytetramethyleneterephthalate.

12. The composition of claim 6 in which the polyester is a polycarbonate.

13. The composition of claim 5 in which the rubber is a homopolymer of 1,3-butadiene.

14. The composition of claim 13 in which the blend comprises about 20 to about 45 parts by weight polyester and about 80 to about 55 parts by weight rubber.

15. The composition of claim 14 having a tensile strength at least 50% higher than the tensile strength of the same composition except the rubber is not cross-linked.

16. The composition of claim 2 in which the rubber is self-curing nitrile rubber.

17. The composition of claim 7 in which $(TS)^2/E$ is greater than 20 Kg./cm$^2$ wherein TS is tensile strength and E is Young's modulus.

18. The composition of claim 1 containing liquid polyester plasticizer in an amount not exceeding the weight of polyester, and in which the total weight of the rubber and polyester plasticizer does not exceed 85 weight percent of the composition.

19. The composition of claim 1 in which the polyester has a melting point between 160°–260° C.

20. The composition of claim 19 in which the rubber is nitrile rubber.

21. The composition of claim 1 in which the polyester is polycaprolactone.

22. The composition of claim 1 in which the rubber is a polyurethane rubber.

23. The composition of claim 6 in which the polyester is a mixed polyphthalate.

24. The composition of claim 2 in which the rubber is EPDM rubber and the polyester is a mixed polyphthalate.

* * * * *

UNITED STATES PATENT OFFICE
CERTIFICATE OF CORRECTION

PATENT NO. : 4,141,863
DATED : February 27, 1979
INVENTOR(S) : A.Y. Coran and R. Patel It is certified that error appears in the above-identified patent and that said Letters Patent are hereby corrected as shown below:

Column 15, Table VII, the line designated "Santocure MOR" was left blank. In stock 2, the quantity "0.6" should be inserted. In the remaining stocks 1, and 3 through 7, dashes should be inserted.

Signed and Sealed this

Nineteenth Day of June 1979

[SEAL]

Attest:

RUTH C. MASON
Attesting Officer

DONALD W. BANNER
Commissioner of Patents and Trademarks